United States Patent [19]

Volling

[11] 4,080,527
[45] Mar. 21, 1978

[54] ELECTRICALLY TRACED PIPING TRANSITION

[75] Inventor: E. Leon Volling, East Alton, Ill.

[73] Assignee: O'Brien Corporation, St. Louis, Mo.

[21] Appl. No.: 719,400

[22] Filed: Sep. 10, 1976

[51] Int. Cl.² .......................... F24H 1/12; H05B 1/00
[52] U.S. Cl. .................................... 219/301; 73/431; 174/65 R
[58] Field of Search ............... 174/18, 50, 52 R, 52 S, 174/52 PE, 65 R, 76; 219/301; 73/273, 274, 277, 431; 137/341; 138/33

[56] References Cited

U.S. PATENT DOCUMENTS 3,731,534  5/1973  Painley et al. ..................... 73/431 X

FOREIGN PATENT DOCUMENTS 682,593  11/1952  United Kingdom .............. 174/65 R Primary Examiner—Laramie E. Askin
Attorney, Agent, or Firm—Polster, Polster and Lucchesi

[57] ABSTRACT

A novel transition through a wall separating a hazardous area from a less hazardous area is provided for an electrically traced, insulated conduit. The transition provides continuity of heating and insulation for the conduit while providing electrical isolation between the hazardous and less hazardous areas. The transition also provides mechanical support and protection and allows simple installation of the traced conduit through the wall.

14 Claims, 6 Drawing Figures

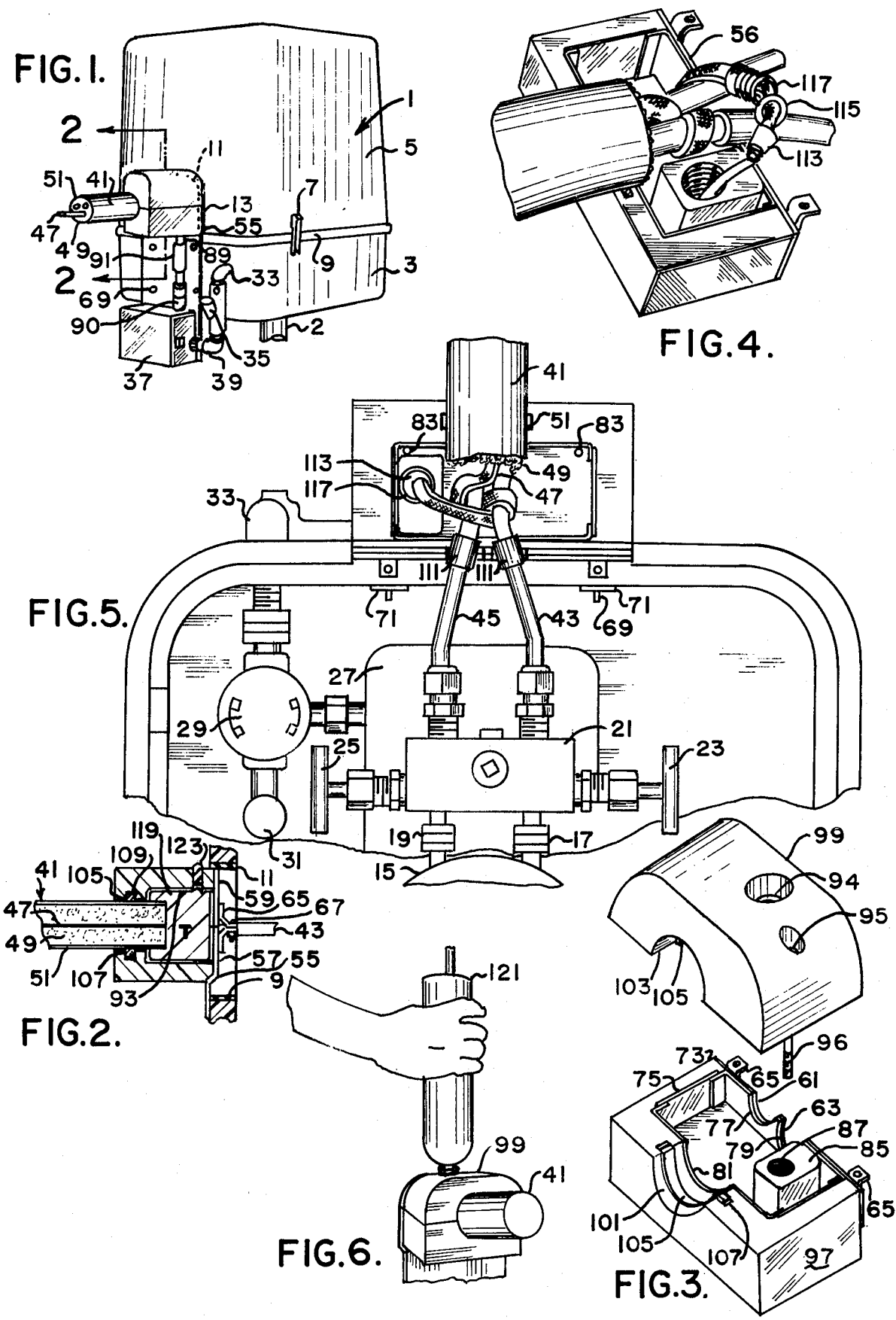

ELECTRICALLY TRACED PIPING TRANSITION

BACKGROUND OF THE INVENTION

This invention relates to electrically traced conduits (that is, pipes, tubes or the like which carry fluid), and in particular to a novel means for carrying such a conduit through a wall which separates a highly hazardous area from a less hazardous area.

Electrically traced conduit is widely used, for example, in process industries, to maintain the temperature of a fluid in the conduit at or above some critical temperature. The critical temperature is generally the freezing point of the fluid, but may also be, for example, the condensation temperature of a gas or the temperature at which the viscosity of a liquid becomes undesirably great.

Electrically traced conduit may take many forms. The electrical heat tracer has traditionally been a mineral insulated heating cable, the heat flux of which is dependent on the length of the cable. More recently, heat tracers have been produced in the form of a strip which includes a pair of conductors separated by a resistor material. Because the parallel conductors carry full line voltage throughout their length, the heat output per foot is independent of the length of the cable. If the resistor material has a positive temperature coefficient, the heater strip becomes self-limiting and will not exceed a predetermined temperature even if it is wrapped across itself. Such self-limiting parallel-circuit heating tape is commercially available by itself or as part of a "bundle" which includes one or more conduits and one or more heating tapes surrounded by insulation and enclosed in a water-impervious jacket. When a preinsulated bundle is not used, insulation must be added around the conduit after it is traced.

Because parallel circuit heating tape carries full line voltage throughout its length, it must be provided with a metallic armor, properly grounded, in any environment in which flammable or explosive vapors may be present. In environments where flammable or explosive vapors may normally be encountered, the use of parallel-circuit heating cable is presently prohibited. Such areas are classified as Class 1, Division 1 areas by the National Electric Code and are designated "hazardous areas" herein. When a conduit is traced with an electrical heat tracer which is not approved for hazardous areas and when that conduit extends into a hazardous area, certain additional difficulties arise which have not heretofore been resolved in any fully satisfactory manner.

Although the presence of a hazardous fluid in a conduit does not in itself render the area around the conduit hazardous, electrically traced conduits may well extend into an area which is designated hazardous. One situation in which a traced conduit may extend into a hazardous area arises when the flow, volume or pressure of a hazardous fluid must be measured in an environment where the temperature may drop below the freezing point of the fluid. For example, the flow of a hazardous fluid through a pipe may be measured by determining the pressure differential across an orifice plate in the pipe. Impulse lines communicating with the pipe on opposite sides of the orifice plate lead to a meter which derives a flow indication from the relative pressures in the impulse lines. In such installations, both the impulse lines and the meter may need to be freeze-proofed. The impulse lines are protected by electrical tracing and insulation. The meter can be protected by enclosing it in a heated insulative enclosure, such as a foamed polyurethane box. Because the meter includes a number of manually operable valves with their associated packing and other connections which are routinely loosened and tightened, it is to be expected that during its life a certain amount of leakage will occur. The interior of the meter enclosure may therefore be considered to be a hazardous area, and all electrical wiring, including heating elements, in the enclosure may be required to be housed in protective explosion-proof containers. Prior to the present invention, no effective means has been known for providing a transition between the traced lines outside the enclosure and the interior of the enclosure. If the tracer and insulation are spaced from the enclosure, the lines can freeze. If they are brought up to the wall of the enclosure, they become effectively a part of the enclosure and present a danger. Furthermore, no provision has previously been made for supporting and protecting the lines, and more importantly the tracer and any electrical connections to the tracer. It will be appreciated that generally the same problem has been encountered whenever an electrically traced conduit, traced with a non-approved heat tracer, extends through a wall separating a hazardous area from a less hazardous area, and the general problem has been equally lacking a satisfactory solution.

SUMMARY OF THE INVENTION

One of the objects of the invention is to provide a transition between a hazardous area and a less hazardous area for an electrically traced conduit.

Another object is to provide such a transition which includes a means for providing continuity of heating and insulation while at the same time isolating the electrical tracer outside the hazardous area.

Another object is to provide such a transition which affords easy installation of the traced conduit and easy electrical connection of the electrical tracer and of a heater in the hazardous area.

Another object is to provide such a transition which provides proper mechanical support and protection of all electrical junctions as well to the conduit.

Another object is to provide such a transition which provides proper ground continuity for the electrical heat tracer cable.

Other objects will become apparent in light of the following description and accompanying drawings.

In accordance with this invention, generally stated, a transition is provided for safely carrying an electrically traced conduit through a wall separating a hazardous area from a less hazardous area. The transition provides continuity of heating and insulation, and at the same time isolates the electrical heat tracer outside the hazardous area. The transition includes a receptacle, preferably mounted on the wall in heat transfer relationship to it. The traced conduit extends into the receptacle. Within the receptacle the conduit and electrical heat tracer are separated and the untraced conduit extends out of the receptacle and into the hazardous area. At least a part of the receptacle is filled with a material which isolates the electrical heat tracer from the hazardous area.

In the preferred embodiment, the hazardous area is an insulative enclosure containing at least one fitting which is subject to leakage. An explosion-proof heater is provided in the enclosure to maintain the temperature of the enclosure above a critical value. A mounting plate is secured to a wall of the enclosure. A portion of the mounting plate covers an opening in the enclosure, and to this portion of the plate is mounted the transition receptacle. The insulated and traced conduit extends through an opening into the receptacle. Within the receptacle, the insulation terminates, and the conduit extends through the receptacle into the enclosure. The receptacle is filled with an elastomeric sealant to isolate it from the interior of the enclosure. Also in the preferred embodiment, the tracing cable is grounded within the transition receptacle and brought out to a junction box which is also carried by the mounting plate and in which both the explosion-proof heater and the tracer cable are connected to a source of power.

These and other aspects of this invention are best understood with reference to the following detailed description of the preferred embodiment.

BRIEF DESCRIPTION OF THE DRAWINGS

FIG. 1 is a view in perspective of an insulated instrument casing into which extend a pair of electrically traced impulse lines through a transition of the present invention;

FIG. 2 is a sectional view, taken along line 2—2 of FIG. 1;

FIG. 3 is a detail in perspective of the transition box of FIGS. 1 and 2, before installation of the traced impulse lines;

FIG. 4 is a view in perspective of the lower half of the transition box of FIG. 3 showing one step of the installation of the traced impulse lines through it;

FIG. 5 is a top plan view, partially broken away, of the enclosure, traced impulse lines and lower half of the transition box, showing a further stage of their assembly; and FIG. 6 is a somewhat diagrammatic view in perspective of the transition box showing a final stage of assembly of the transition of the present invention.

DESCRIPTION OF THE PREFERRED EMBODIMENT

Referring now to the drawings, reference numeral 1 indicates an enclosure made of a foamed polyurethane material. The enclosure 1 is supported on a two-inch pipe 2. The enclosure 1 included a lower section 3 and an upper section 5, hinged together at the rear and held together snugly by releasable latches 7. A gasket 9 around the lip of the lower section 3 forms a seal with the lip of the upper section 5, and a gasket 11 around a cutout in the upper section 5 forms a seal with a split metal mounting plate 13, described in more detail hereinafter. The lower section 3, upper section 5 and mounting plate 13 form a generally sealed enclosure for a differential pressure meter 15. As shown particularly in FIG. 5, the meter 15 is connected through a pair of fittings 17 and 19 to a manifold 21 carrying a pair of manual shut-off valves 23 and 25. Also contained in the enclosure 1, below the meter 15 and manifold 21, is an approved heater 27, having a maximum surface temperature well below the flash point of the fluid being metered, and approved for use in a hazardous area. The heater 27 is electrically connected through an explosion-proof junction box 29 to a thermostat 31 and to the exterior of the enclosure 1 through a pipe elbow 33. Below the elbow 33, and exterior of the enclosure 1, a wye 35 contains a hardened sealing material surrounding the wiring for the heater 27 and thermostat 31. The sealing material forms a barrier between the area inside the enclosure 1 and a junction box 37 connected to the wye 35 by further piping 39. The enclosure 1 and heater 27 maintain the temperature of the meter 15 at a temperature near 50° F even when the temperature outside the enclosure 1 falls to −60° F, with an 8 mile-per-hour wind. The structures thus far described are known, and in themselves do not form part of the present invention.

A tubing bundle 41 includes a pair of impulse lines 43 and 45 carrying a flammable liquid from opposite sides of an orifice plate in a pipe line, not shown, to the adjustment block 21 and meter 15. In the bundle 41, the lines 43 and 45 are electrically traced with a variable-resistance, parallel-conductor, armored heating strip 47. The electrical tracer 47 and impulse lines 43 and 45 are surrounded by a cross-linked polypropylene foam 49, which is jacketed with a modified polyolefin jacket 51 to protect the bundle from the environment. Such traced and insulated bundles are presently commercially available. The tubing bundle 41 is capable of maintaining a temperature of 50° F in a −60° F environment.

The mounting plate 13 is a one-eighth inch steel plate, with an offset 55 about 4 inches four its upper edge, to center the upper part of the plate above the lip of lower section 3 of the enclosure 1. About two inches from its upper edge, the plate 13 is split as indicated at 56, to form a lower part 57 and an upper part 59. Semicircular notches 61 and 63 are cut in the edge 56 of the lower part 57 of the plate 13 to accommodate the impulse lines 43 and 45. Similar semicircular notches are cut in the upper part 59. The upper and lower parts 57 and 49 of the mounting plate 13 are secured to each other by mating angle brackets 65 and bolts 67. The mounting plate 13 is held to the lower section 3 of the enclosure 1 by bolts 69 secured to stiffening plates 71 inside the enclosure 1.

The junction box 37 is mounted securely to the lower part of the mounting plate 13, thereby providing it with the required support.

Near its top, the support plate 13 supports a stainless steel transition box 73. The transition box 73 includes a lower half 75 welded to the lower part 57 of the mounting plate 13, in good heat transfer relationship with it. The rear wall of the lower half 75 includes semicircular notches 77 and 79 aligned face to face with the notches 61 and 63 of the mounting plate 13. The front wall of the lower half 75 includes a semicircular opening 81 sized to form a snug fit with the tubing bundle 41 without cutting into its jacket 51. The bottom wall of the lower half 75 includes a pair of threaded openings 83. An aluminum block 85 fastened to the bottom wall of the box half 75 includes a tapped hole 87 extending through the botton wall of the box half 75. A pipe 89 is threaded into the lower end of the hole 87 and, with further piping 90 and an adjustment sleeve 91, forms a wireway from the transition box 73 to the junction box 37.

The upper half 93 of the transition box 73 is generally the same as the lower half 75. It does not carry a block like the block 85 or its associated hole 87, but includes a central hole 94 in its upper wall, for purposes to be described. Also, the holes 95 through it corresponding to the holes 83 are somewhat larger and are not threaded, to permit the front parts of the box halves 75 and 93 to be held together by bolts 96.

To provide additional protection, for the most severe conditions, the upper and lower halves of the box 73 are surrounded by molded foam polyurethene insulation indicated at 97 and 99 respectively. Insulation halves 97 and 99 are respectively congruent, in cross section, with the lower and upper parts 57 and 59 of the mounting plate 13, and the lower insulation extends approximately to the offset 55 in the mounting plate 13. Semicircular channels 101 and 103, of slightly larger diameter than the circular opening 81 in the transition box, are provided in the insulation halves 97 and 99 respectively, to accommodate the traced tubing bundle 41. A split foam rubber ring 105, carried in grooves 107 and 109 in the channels 101 and 103 respectively, provides a relatively tight seal around the tubing bundle 41.

The traced bundle 41 extends into the transition box 73 through the opening 81. The impulse lines 43 and 45 extend through the circular openings 61/77 and 63/79 to the manifold 21. Rubber sleeves 111 protect the lines 43 and 45 from damage by the openings 61/77 and 63/79 and provide relatively tight seals at those points. The armored heater strip 47 is wrapped around the impulse lines sufficiently to provide adequate heat to the inpulse lines under the expected conditions. As shown in FIGS. 4 and 5, a single wrap around each line is generally sufficient for even the most severe conditions when insulation 97 and 99 is provided around the box 73. The armor of strip 47 is terminated with a lead grommet 113 held in tight electrical contact with the upper end of pipe 89 by a washer 115 and knurled bushing 117. The entire interior of the box 73 is filled with a cured potting (encapsulating) compound 119. The compound 119 is necessarily an electrical insulator, and is preferably elastomeric, to prevent damage to itself, to the impulse lines 43 and 45, or to the heater strip 47 with changes in temperature. Numerous suitable synthetic rubber compounds are commercially available.

Tests made on the illustrative embodiment, with the traced bundle 41 and the thermostat 31 chosen to maintain a temperature of about 50° along lines 43 and 45 and inside the enclosure 1, indicate that the illustrative transition maintains the impulse lines 43 and 45 well above freezing (32° F) even when the outside temperature is lowered to −60° F with a wind of 8 miles per hour. When the exterior insulation 97 and 99 is removed, under the same conditions the temperature of the impulse lines 43 and 45 through the transition box 73 drops from 46° F to 20° F in a space of one-half inch from the mounting plate. This amount of protection is sufficient for many purposes, and is far greater than if the impulse lines were exposed between the end of insulation 49 (and jacket 51) and mounting plate 13.

The installation of a traced conduit through the transition of the present invention into the enclosure 1 is particularly simple. All of the parts necessary for thermally protecting the meter 15 and its associated impulse lines 43 and 45 can be shipped to the installation site as an easily installed kit. The enclosure 1 can be factory assembled with at least the following elements installed: mounting plate 13; heater 27; junction box 29; thermostat 31; protective piping 33, 35 and 39; junction box 37; wiring for the heater 27, including the seal in the wye 35; transition box 73 and associated insulation 97 and 99; block 85 and protective piping 89, 90, and 91; and split ring 105. The kit may also include a cartridge containing potting compound 119, a rubber plug 123 for sealing the opening 94, grommet 113, washer 115 and bushing 117. A mounting bracket, not shown, may also be be preinstalled in the enclosure 1 for mounting the meter 15 and manifold 21. The tubing bundle 41 is generally supplied separately.

At the installation site, the tubing bundle 41 is connected to the pipe line by standard techniques. Briefly, the insulation and tubing are cut at a sufficient distance from the end of the bundle to allow the exposed heat tracer 47 to heat any exposed tubing and valves at the point of connection. An end seal is installed to the free end of the heat tracer 47 and the end of the tubing bundle is water-proofed with a sealant. The connection is then insulated and water-proofed as required.

The bundle 41 is routed to the enclosure 1 with any required support being supplied by hangers or the like.

At the enclosure 1, the meter 15 and manifold 21 are installed. The bundle 41 is cut to a length sufficient to permit the impulse lines 43 and 45 to be connected to the manifold 21 and for the tracer strip 47 to be wrapped around the impulse lines as required and installed through the piping 89, 90 and 91 into the junction box 37. The jacket 51 and insulation 49 are cut to a length which allows them to extend about one-half inch into the transition box 73. Either the impulse lines 43 and 45 or the tracer strip 47 is trimmed to the necessary length. Rubber sleeves 111 are installed over the impulse lines 43 and 45. About fifteen inches of armor is removed from the end of the tracer strip 47, the resistive material is cut from between the parallel conductors of the strip, and a pair of heat-shrinkable tubes are slipped over the conductors and shrunk into place, to provide integral leads for the heater strip 47. The bushing 117, washer 115 and grommet 113 are slipped over the armored strip 47 and the lead grommet 113 is squeezed tightly around the cut end of the armor. After the tracer strip 47 is wrapped around the impulse lines 43 and 45, its newly formed integral leads are pulled through the opening 87 in the block 85 while the threaded bushing 117 is threaded into the opening 87 and tightened to insure that the lead grommet 113 makes good electrical contact with the upper end of the pipe 89. The impulse lines 43 and 45 are then installed in the manifold 21. After standard continuity and insulation resistance checks have been made, the edges of the transition box halves 75 and 93 and the inside of the knurled bushing 117 are temporarily sealed with flexible sealant. The upper half 93 of the transition box 73 is positioned and held in place with bolts 67 and 96. More of the flexible sealant is applied around the sleeves 111. The uncured synthetic rubber potting compound 119 is mixed and injected into the transition box 73 by means of a cartridge 121. The box is filled to within one-quarter inch of its top, to allow for expansion of the sealant as it cures. While the sealant 119 is curing, a rubber plug 123 in the hole 94 protects it from contamination. When potting compound 119 has fully cured, the leads of the tracer 47 and wiring for the heater 27 are both connected, within the junction box 37, to a source of electrical power.

Numerous variations in the transition of this invention, within the scope of the appended claims, will occur to those skilled in the art in light of the foregoing disclosure. For example, the bundle 41 could contain different numbers or types of conduits or electrical heat tracers. The conduit may be traced and insulated at the time of installation. Separately installed insulation may require other modifications of the transition box, such as a collar surrounding the traced line insulation, to maintain continuity of insulation. The transition receptacle may be incorporated, in part or in whole, in the wall defining the edge of the hazardous area. The transition receptacle may be positioned on the hazardous side of the wall (e.g., the transition box 73 could be inside the enclosure 1 of the preferred embodiment). The insulation around the transition box may be omitted if the most severe expected environmental temperatures do not require it, or if the transition box is positioned inside a heated enclosure. The electrical heat tracer may be brought into a protective tube extending directly from the transition box into the enclosure. These variations are merely illustrative.

I claim:

1. Transition means for safely carrying an electrically traced conduit through a wall from a first side of said wall to a second side of said wall, said traced conduit comprising an electrical heat tracer in heat conducting relation to a conduit and insulation surrounding said conduit and said tracer; said transition means providing continuity of heating and insulation while isolating said heat tracer from said second side of said wall; said transition means comprising a receptacle, said conduit and said tracer being separated within said receptacle, said conduit extending through said receptacle and said tracer extending into said receptacle, and sealing means filling at least a part of said receptacle for isolating said tracer from said second side of said wall.

2. The transition means of claim 1 wherein said receptacle is constructed and positioned to be in heat conducting relationship with said second side of said wall.

3. The transition means of claim 2 wherein said second side of said wall comprises the interior of an enclosure.

4. The transition means of claim 3 wherein said wall is made of metal and said receptacle is positioned outside said enclosure.

5. The transition means of claim 4 wherein said receptacle comprises a metal box.

6. The transition means of claim 5 wherein said box is surrounded by a layer of insulation.

7. The transition means of claim 1 including protective conduit means secured to said receptacle, said protective conduit means carrying conductors electrically connected to said tracer.

8. The transition means of claim 1 wherein said sealing means is a cured potting compound and substantially fills said receptacle.

9. A method for safely carrying a conduit through a wall separating a first area from a second area, said conduit being traced in said first area with a tracer not approved for use in said second area, said method comprising the steps of extending said conduit and said tracer into a receptacle at said wall, separating said conduit and said tracer in said receptacle, and filling at least a part of said receptacle with a curable sealing material to isolate said tracer from said second area.

10. The method of claim 9 wherein said step of filling at least a part of said receptacle with a curable sealing material includes surrounding at least a part of said conduit and at least a part of said tracer with said sealing material.

11. The method of claim 10 wherein said conduit and said tracer are contained in a bundle comprising a continuous extruded jacket of waterproof material, said jacket being filled with an insulating material surrounding said conduit and said tracer, and wherein said step of filling at least a part of said receptacle with a curable sealing material includes encapsulating with said sealing material an end of said bundle and those parts of said conduit and said tracer which are exposed in said part of said receptacle before said part of said receptacle is filled with said sealing material.

12. Transition means for safely carrying an electrically traced conduit through a wall of an insulative enclosure containing a heater and at least one fluid fitting which is subject to leakage of a hazardous fluid, from the exterior of said enclosure to the interior of said enclosure, said traced conduit comprising an electrical heat tracer in heat conducting relation to a conduit and insulation surrounding said conduit and said tracer; said transition means providing continuity of heating and insulation while isolating said heat tracer from the interior of said enclosure; said transition means comprising a receptacle, said conduit and said tracer being separated within said receptacle, said conduit extending through said receptacle and said tracer extending into said receptacle, and sealing means filling at least a part of said receptacle for isolating said tracer from the interior of said enclosure.

13. The transition means of claim 12 including a mounting plate defining a part of said wall, said mounting plate and said receptacle being formed of metal, and said receptacle being carried by said mounting plate on the outside of said enclosure.

14. The transition means of claim 12 wherein said sealing means is a cured potting compound and substantially fills said receptacle.

* * * * *

UNITED STATES PATENT AND TRADEMARK OFFICE
CERTIFICATE OF CORRECTION

PATENT NO. : 4,080,527
DATED : March 21, 1978
INVENTOR(S) : E. Leon Volling

It is certified that error appears in the above-identified patent and that said Letters Patent are hereby corrected as shown below:

Column 4, line 23 change --- four --- to --- from ---.

Column 4, line 31 change --- 57 and 49 --- to --- 57 and 59 ---.

Column 5, line 20 change --- inpulse --- to --- impulse ---.

Signed and Sealed this

Twenty-eighth Day of November 1978

[SEAL]

Attest:

RUTH C. MASON
Attesting Officer

DONALD W. BANNER
Commissioner of Patents and Trademarks